United States Patent [19]

LaRue

[11] Patent Number: 4,836,772
[45] Date of Patent: Jun. 6, 1989

[54] BURNER FOR COAL, OIL OR GAS FIRING

[75] Inventor: Albert D. LaRue, Summit County, Ohio

[73] Assignee: The Babcock & Wilcox Company, New Orleans, La.

[21] Appl. No.: 190,734

[22] Filed: May 5, 1988

[51] Int. Cl.[4] .......................... F23M 9/06; F23Q 9/00; F23C 7/00; F23D 1/00
[52] U.S. Cl. .................................. 431/285; 431/171; 431/284; 431/187; 110/263
[58] Field of Search ............... 431/284, 285, 187, 181, 431/186, 171, 189, 279; 110/263

[56] References Cited

U.S. PATENT DOCUMENTS

| | | | |
|---|---|---|---|
| 3,145,670 | 8/1964 | Copian et al. | 110/28 |
| 3,195,606 | 7/1965 | Stout | 431/171 |
| 3,788,796 | 1/1974 | Krippene et al. | 431/2 |
| 3,904,349 | 9/1975 | Peterson et al. | 431/184 |
| 4,095,929 | 6/1978 | McCartney | 431/284 |
| 4,157,889 | 6/1979 | Bonnel | 431/182 |
| 4,208,180 | 6/1980 | Nakayasu et al. | 431/284 |
| 4,243,375 | 1/1981 | Reed | 431/284 |
| 4,270,895 | 6/1981 | Vatsky | 431/183 |
| 4,309,386 | 1/1982 | Pirsh | 422/177 |
| 4,333,405 | 6/1982 | Michelfelder et al. | 110/264 |
| 4,380,202 | 4/1983 | LaRue et al. | 110/263 |
| 4,412,810 | 11/1983 | Izuha et al. | 431/187 |
| 4,422,389 | 12/1983 | Schröder | 431/284 |
| 4,545,307 | 10/1985 | Morita et al. | 110/264 |
| 4,610,625 | 9/1986 | Bunn | 431/285 |
| 4,748,919 | 6/1988 | Campobenedetto et al. | 431/284 |

OTHER PUBLICATIONS

Advanced In-Furnace $NO_x$ Reduction Systems to Control Emissions-M. A. Acree & A. D. LaRue presented to the American Power Conference in Chicago, IL, on Apr. 22-24, 1985-Entire Document.
Operating Experiences of Coal Fired Utility Boilers Using Hitachi $NO_x$ Reduction Burners-T. Narita, F. Koda, T. Masai, S. Morita & S. Azuhata, 1987 Joint Symposium on STA. $NO_x$ Control-Mar. 23-26, 1987--Entire Doc.
Developmental Status of B&W's Second Generation Low $NO_x$ Burner-The XCL Burner, A. D. La Rue & M. A. Acree-1987.
Jt. Symp. on Stationary Comb. $NO_x$ Control-Mar. 23-26, 1987, New Orleans, LA-Spons., by U.S. EPA & E.P.R.I.-Entire Document.

Primary Examiner—Randall L. Green
Assistant Examiner—Denise L. Ferensic
Attorney, Agent, or Firm—Vytas R. Matas; Eric Marich

[57] ABSTRACT

An improved burner for the combustion of coal, oil or gas places a plurality of retractable and rotatable gas elements in close proximity to the outlet end of a tubular burner nozzle of the burner which are shielded from combustion air provided around the tubular burner nozzle by a flame stabilizing ring having a plurality of openings adapted to closely receive each of the plurality of retractable and rotatable gas elements. Eddies produced by the flame stabilizing ring create a low oxygen/fuel rich flame resulting in reduced $NO_x$ formation.

12 Claims, 4 Drawing Sheets

BURNER FOR COAL, OIL OR GAS FIRING

BACKGROUND OF THE INVENTION

1. Field of the Invention

The present invention relates to fuel burners and, more particularly, to an improved burner for reducing the formation of nitric oxides during the combustion of pulverized, liquid or gaseous fuels.

One source of atmospheric pollution is the nitrogen oxides ($NO_x$) present in the stack emission of fossil fuel fired steam generating units. Nitric oxide (NO) is an invisible, relatively harmless gas. However, as it passes through the vapor generator and comes into contact with oxygen, it reacts to form nitrogen dioxide ($NO_2$) or other oxides of nitrogen collectively referred to as nitric oxides. Nitrogen dioxide is a yellow-brown gas which, in sufficient concentrations, is toxic to animal and plant life. It is this gas which may create the visible haze at the stack discharge of a vapor generator.

Nitric oxide is formed as a result of the reaction of nitrogen and oxygen and may be thermal nitric oxide and/or fuel nitric oxide. The former occurs from the reaction of the nitrogen and oxygen contained in the air supplied for the combustion of a fossil fuel whereas the latter results from the reaction of the nitrogen contained in the fuel with oxygen in the combustion air.

The rate at which thermal nitric oxide is formed is dependent upon any or a combination of the following variables; (1) flame temperature, (2) residence time of the combustion gases in the high temperature zone and (3) excess oxygen supply. The rate of formation of nitric oxide increases as flame temperature increases. However, the reaction takes time and a mixture of nitrogen and oxygen at a given temperature for a very short time may produce less nitric oxide than the same mixture at a lower temperature, but for a longer period of time. In vapor generators of the type hereunder discussion wherein the combustion of fuel and air may generate flame temperatures in the order of 3,700° F., the time-temperature relationship governing the reaction is such that at flame temperatures below 2,900° F. no appreciable nitric oxide (NO) is produced, whereas above 2,900° F. the rate of reaction increases rapidly.

The rate at which fuel nitric oxide is formed is principally dependent on the oxygen supply in the ignition zone and no appreciable nitric oxide is produced under a reducing atmosphere; that is, a condition where the level of oxygen in the ignition zone is below that required for a complete burning of the fuel.

It is apparent from the foregoing discussion that the formation of thermal nitric oxide can be reduced by reducing flame temperatures in any degree and will be minimized with a flame temperature at or below 2,900° F. and that the formation of fuel nitric oxide will be inhibited by reducing the rate of oxygen introduction to the flame, i.e., air/fuel mixing.

In the U.S., Federal and state regulations are forcing development of fossil fueled combustion equipment capable of reduced $NO_x$ production. Lower $NO_x$ emission requirements apply to pulverized, liquid and gaseous fuels, such as coal, oil and natural gas. While the energy shortages of the early 1970's have contributed to efforts for conservation of oil and gas, utilities in many areas of the country are unable to convert their oil and gas fired vapor generators to coal firing due either to limitations of the existing equipment or due to the increased particulate emissions attendant with coal vapor steam generators. In other situations, the need sometimes arises for a burner having hardware capable of firing all three fuels, though not necessarily more than one of these three fuels at a time. Accordingly, a need exists for equipment capable of achieving reduced $NO_x$ emissions when firing coal, oil and, in particular, natural gas, and which can be retrofitted to existing steam generator units.

2. Description of the Prior Art

Reducing $NO_x$ emissions from fossil-fueled vapor generator units can take several approaches. One approach uses fuels lower in nitrogen content, if such flexibility is available. This only addresses part of the problem, however, and fails to address $NO_x$ production arising out of the combustion process itself. Further, Federal and/or State emission regulations may take the lower fuel bound nitrogen levels into account when setting the standards to be met, and thus set a target level lower than what had to be met with the original fuel(s).

A second approach focuses on cleaning up the $NO_x$ emissions produced by the combustion process itself, taking the nitrogen in the fuel and the efficiencies of the burning of the fuel as given factors in the overall process. One example of this is disclosed in U.S. Pat. No. 4,309,386 to Pirsh, assigned to The Babcock & Wilcox Company. Pirsh discloses a filter house that employs a selective catalytic reduction process for removing $NO_x$ emissions from a flue gas stream while simultaneously filtering out and collecting entrained particulate matter from the stream. An extended treatment of both of the above approaches is beyond the scope and focus of the present application.

The third approach focuses upon the formation of $NO_x$ emissions during the combustion process itself, and is what was referred to earlier as thermal nitric oxide and/or fuel nitric oxide. The combustion process involves the introduction of a fossil fuel and air into the furnace of the steam generator. Developments have thus focused on the fuel/air introduction equipment, alone, as well as in combination with the furnace of the steam generator.

Krippene, et al (U.S. Pat. No. 3,788,796), also assigned to The Babcock & Wilcox Company, is drawn to an improved pulverized fuel burner apparatus and method for inhibiting the formation of fuel nitric oxide and providing the lower peak flame temperatures required to minimize the formation of thermal nitric oxide. Krippene, et al's burner is known in the art as a dual register burner (DRB) because it employs two dampers or registers for separately apportioning and controlling combustion air flow between inner and outer annular passageways. The inner and outer annular passageways are concentrically placed around a central, tubular pulverized fuel nozzle. The pulverized fuel nozzle conveys a mixture of pulverized fuel and combustion/transport air to the furnace where it is ignited and burned with the rest of the combustion air flow provided by the aforementioned inner and outer annular passageways.

Peterson, et al (U.S. Pat. No. 3,904,349), also assigned to The Babcock & Wilcox Company, is drawn to an improved liquid or gaseous fuel burner apparatus having a central passageway, a first and a second annular passageway, and separate means for apportioning the flow of combustion air among these passageways to achieve complete combustion of the fuel while reducing the formation of nitric oxides. The liquid fuel supplied to and atomized within the burner is sprayed into the circular burner port of the furnace in a pattern substantially symmetrical with the axis of the port. A central fuel tube or nozzle conveys the liquid or gaseous fuel to an atomizing assembly including a sprayer plate located at the outlet end of the fuel tube or nozzle. The central fuel tube or nozzle extends through and out of a guide tube which supports at its distal end a truncated cone air deflecting device, through which the sprayer plate extends, which deflects combustion air conveyed by the central passageway and a portion of the combustion air conveyed by the first annular passageway. Initial burning of the fuel is conducted in a reducing zone by adjusting the quantity of combustion air discharged through the central passageway; air admitted through the first annular passageway causes recirculation of air about the outer periphery of the reducing zone to create a flame stabilizing zone; and finally, the remaining air for complete combustion is discharged through the second annular passageway so as to envelop the reducing and stabilizing zones and eventually mix with the fuel to complete its combustion.

LaRue, et al (U.S. Pat. No. 4,380,202), also assigned to The Babcock & Wilcox Company, is drawn to a mixer for a dual register burner for the combustion of pulverized fuel. Instead of the venturi section and conical end-shaped rod member utilized in the apparatus of Krippene, et al, supra, a deflector and a diffuser having a plug and a shroud member are located within the tubular pulverized fuel nozzle. As a result, flow separation or fuel roping which can occur in the pulverized fuel nozzle is eliminated with minimum pressure loss effect on the primary air/pulverized fuel stream.

As indicated earlier, another development to reduce $NO_x$ formation in the combustion of fossil fuels focuses on the combination/placement of the fuel/air burning equipment with respect to the furnace itself, and is known as two-stage combustion or TSC. TSC involves establishing a lower, air deficient burner zone and an upper/downstream "after-air" or "over-fire-air" zone in the furnace. The amount of air by which the lower burner zone is deficient is injected in the over-fire-air zone downstream to complete the combustion process. In essence, the whole furnace is used as the combustion zone. A more refined version of TSC developed as a result of strict $NO_x$ emission limits in Japan and is known as In-Furnace $NO_x$ Reduction or IFNR. A description of this process is contained in a paper entitled "Advanced In-Furnace $NO_x$ Reduction Systems to Control Emissions" by M. A. Acree and A. D. LaRue, presented to the American Power Conference in Chicago, Illinois on Apr. 22–24, 1985.

Briefly, the IFNR approach, jointly developed by Babcock-Hitachi K. K. and Tokyo Electric Power Company, employs multiple combustion zones in the furnace. The main and lowest zone, the burner zone, utilizes low $NO_x$ burners operated at less than theoretical air levels to reduce the total amount of $NO_x$ produced. The gases and char from this main burner zone pass upwards into a reburning zone, that operates at even lower air levels. Due to the low air levels, the fuel decomposes and forms hydrocarbon radicals that chemically combine to reduce the $NO_x$ directly and which, in turn, further reduce the $NO_x$ present. Upon leaving the reburning zone, since the $NO_x$ levels in the flue gas have been reduced, the balance of the combustion air needed is introduced via overfire air parts in the combustion zone.

In new steam generator construction that applies either TSC or IFNR technology, the furnace volume and height are chosen to accommodate the extended combustion requirements so that the combustion products are completely burned before the flue gas passes across the radiant and/or convective heat transfer tube banks of the vapor generator.

In a retrofit application, however, the furnace volume and height are usually not variable, and the optimum furnace dimensions needed for proper application of TSC or IFNR may not be available. These problems were discussed in a paper entitled "Operating Experiences of Coal Fired Utility Boilers Using Hitachi $NO_x$ Reduction Burners", By T. Narita, F. Koda, T. Masai, S. Morita, and S. Azuhata, presented at the 1987 Joint Symposium on Stationary Combustion $NO_x$ Control, in New Orleans, La., on Mar. 23–26, 1987, sponsored by the U.S. Environmental Protection Agency and the Electric Power Research Institute. As indicated in both the Acree, et al and Narita, et al papers discussed above, generation of low $NO_x$ levels minimizes the amount of $NO_x$ to be destroyed downstream. Improvement of the existing dual register burner (DRB) led to the development of what is known in the art as the Hitachi-NR burner (HTNR) for pulverized coal and the Primary Gas-Dual Register Burner (PG-DRB) for liquid and gaseous fuels.

Morita, et al (U.S. Pat. No. 4,545,307) is drawn to the improved HTNR burner mentioned above. In the prior art DRB (such as Krippene, et al) the pulverized coal stream is supplied with only enough air to transport the coal; consequently, the burner flame at the burner throat entrance to the furnace formed a good reducing atmosphere. The balance of the combustion air, called secondary and tertiary air, came to the burner throat via the inner and outer annular passageways, respectively, and was to mix downstream of the central, reducing atmosphere burner flame. Too early mixing, however, of the secondary/tertiary air and the reducing atmosphere burner flame made maintaining the latter difficult.

Morita, et al modified the DRB for coal firing by attaching a bluff body at the outlet of the pulverized coal pipe, shaped as a ring-form dish having a hole therethrough for passing the pulverized coal/air mixture into the furnace. A portion or apron of the bluff body protrudes into the inside diameter of the pulverized coal pipe to enhance ignitability at the exit thereof, while the outside diameter of the bluff body extends outside of the pulverized coal pipe partially into the secondary air (inner annular) passageway. In addition, an outward guide sleeve is provided, between the secondary air (inner annular) passageway and the tertiary (outer annular) passageway to dispense the tertiary air outwards beyond the central pulverized coal flame, later combining downstream to complete the combustion process. The bluff body creates an eddy flow in the pulverized coal/air stream supplied by the pulverized coal pipe which prevents it from diffusing in an outward manner towards the secondary air stream.

Other development work on improved burners for coal firing has occurred, and is presented in a paper entitled "Development Status of B&W's Second Generation Low $NO_x$ Burner—the XCL Burner", by A. D. LaRue, M. A. Acree and C. C. Masser, presented at the 1987 Joint Symposium on Stationary Combustion $NO_x$ control, in New Orleans, La., on Mar. 23–27, 1987, sponsored by the U.S. Environmental Protection Agency and the Electric Power Research Institute. The XCL burner design disclosed therein while using criteria from the HTNR and DRB burners discussed earlier, was developed for coal firing only.

The Primary Gas-Dual Register Burner (PG-DRB) for oil and gas firing, is a DRB modified to include a recirculated gas annulus which surrounds a primary air zone that houses the oil atomizer, and is disclosed in the Acree, et al reference mentioned above. It should be noted that, in this context, the term "recirculated gas" refers to flue gas, rather than fuel gas. The source of the recirculated gas would be from a point somewhere downstream of the last heat transfer surface in the steam generator, for example at the economizer outlet. The recirculated gas shields the base of the oil flame to reduce oxygen availability in the flame core; mixing of recirculated gas with the rest of the combustion air results in all of the combustion air having a lower oxygen content to further suppress $NO_x$ production.

For gas firing, as will be seen by a review of FIG. 4 of the Acree, et al reference, supra, and by referring to FIG. 1 of the present application which shows a slightly modified version of the PG-DRB in schematic form, the gas elements 1 of the PG-DRB are placed in the tertiary air passageways 2 which encircle, successively, the oil atomizer 3, the primary air zone 4, the primary gas zone 5, and the secondary air zone 6. While each gas element 1 has at the outlet end thereof shields 7 which protect the gas outlet nozzle 8 on each gas element 1, it is clearly seen that each gas outlet nozzle 8 is continuously swept by the combustion air flow passing out into the furnace 9 through the tertiary air passageways 2. This arrangement prevents the establishment of any fuel rich/low air reducing zone in the vicinity of each gas outlet nozzle 8 that is crucial for low $NO_x$ emissions. In addition, some applications will also prohibit the use of the PG-DRB scheme, and yet the need for reducing $NO_x$ emissions on gas firing will remain.

Accordingly, it has become desirable to develop an improved burner apparatus capable of separately firing pulverized, liquid or gaseous fuels and which can achieve reduced $NO_x$ emissions on each of these fuels.

SUMMARY OF THE INVENTION

The present invention provides an improved burner for the combustion of coal, oil or gas, and which achieves reduced $NO_x$ emissions when firing any of these fuels.

Accordingly, an improvement is made on fuel burners of the type desclosed in U.S. Pat. Nos. 3,788,796 and 4,545,307 and which is particularly suited for retrofit applications to existing vapor generator units or for use in new construction of vapor generator units. Part of the improved burner is disposed within a windbox to which a portion of the necessary combustion air is supplied, and which is formed between adjacently disposed burner and furnace walls of the vapor generating unit. The burner wall is formed with an access opening for admitting that portion of the improved burner that resides in the windbox. The furnace wall is formed with a burner port that accommodates the combining of the fuel and air into a combustible mixture and the ignition thereof. The ignited combustible mixture is then exhausted into the combustion chamber or furnace of the vapor generator and is used to heat banks of tubes which contain water or steam.

The improved burner can fire coal, oil or gas, and includes separate elements which convey these fuels to the outlet end of the burner and other elements which convey the air needed for combustion to the outlet end of the burner. Starting at the central axis of the burner and working outwards, the improved burner includes a retractable oil atomizer, which conveys a mixture of oil and atomizing media to an atomizer sprayer plate located at the outlet end of the atomizer. The atomizing sprayer plate is located at the outlet end of the burner. The atomizer media, which can be air or steam, is needed to break the oil up into droplets small enough so that they can be ignited. Mechanical, or pressure atomizers are also known and can be employed in place of atomizers which use air or steam. Surrounding the retractable oil atomizer is a tubular burner nozzle. The oil atomizer is centrally located within the tubular burner nozzle and is supported by members attached to the inside of the tubular burner nozzle.

The central passageway area between the outside of the oil atomizer and the inside of the tubular burner nozzle conveys a mixture of primary air and pulverized coal particles to the outlet end of the burner and into the furnace where this mixture will be ignited. Surrounding the tubular burner nozzle is a gas zone sleeve which partially defines an annular enclosure between it and the outside of the tubular burner nozzle. Attached to the outlet end of the tubular burner nozzle is a flame stabilizer ring, which together with the tubular burner nozzle and the gas zone sleeve completes the sides of the annular enclosure.

The flame stabilizing ring has two portions. A first portion circumferentially extends around the outlet end of the tubular burner nozzle and partly into the central passageway, leaving an opening however through which the mixture of primary air and pulverized coal may pass. A second portion of the flame stabilizing ring is L-shaped, and is attached to the first portion of the flame stabilizing ring. This second L-shaped portion extends circumferentially around and outwardly from the outlet end of the tubular burner nozzle.

The annular enclosure contains a plurality of retractable and rotatable gas elements, which are concentrically arranged around the outside of the tubular burner nozzle. These gas elements extend through the annular enclosure, and convey fuel gas to the outlet end of the burner. The second L-shaped portion of the flame stabilizing ring has a plurality of holes or openings which allow the outlet ends of these gas elements to pass through in close proximity to the outlet end of the tubular burner nozzle. The flame stabilizing ring protects or shields these outlet ends of the gas elements from secondary air which is being introduced around the circumference of this area to reduce $NO_x$ emissions. The secondary air is provided to the outlet end of the burner through an inner annular passageway and an outer annular passageway. The inner annular passageway is defined as the space between the gas zone sleeve and an inner zone sleeve which encircles it. The outer annular passageway is defined as the space between the inner zone sleeve and a burner barrel which encircles the inner zone sleeve. To further direct the air exiting from the inner and outer annular passageways, an air separation vane is present which is connected to the outlet end of the inner zone sleeve. The air separation vane extends radially outwardly towards the furnace and circumferentially around the outlet end of the inner zone sleeve. This air separation vane influences the path of the secondary air as it exits from the burner into the furnace. By shielding the outlet ends of the gas elements with the flame stabilizing ring through which they are inserted, a low oxygen/fuel rich flame is produced resulting in reduced $NO_x$ formation.

Accordingly, one aspect of the present invention is drawn to an improved burner for the combustion of coal, oil and in particular, gas, which produces low $NO_x$ levels.

Another aspect of the present invention is drawn to a very particular flame stabilizing ring for a burner having a plurality of gas elements arranged around and in close proximity to a tubular burner nozzle, and which acts to shield the outlet ends of the gas elements from the quantity of air for combustion transported by adjacent annular passageways.

The various features of novelty which characterize the invention are pointed out with particularity in the claims annexed to and forming a part of this disclosure. For a better understanding of the present invention and the advantages attained by its use, reference is made to the accompanying drawings and descriptive matter in which a preferred embodiment of the invention is illustrated.

DESCRIPTION OF THE PREFERRED EMBODIMENT OF THE INVENTION

Figure 1:
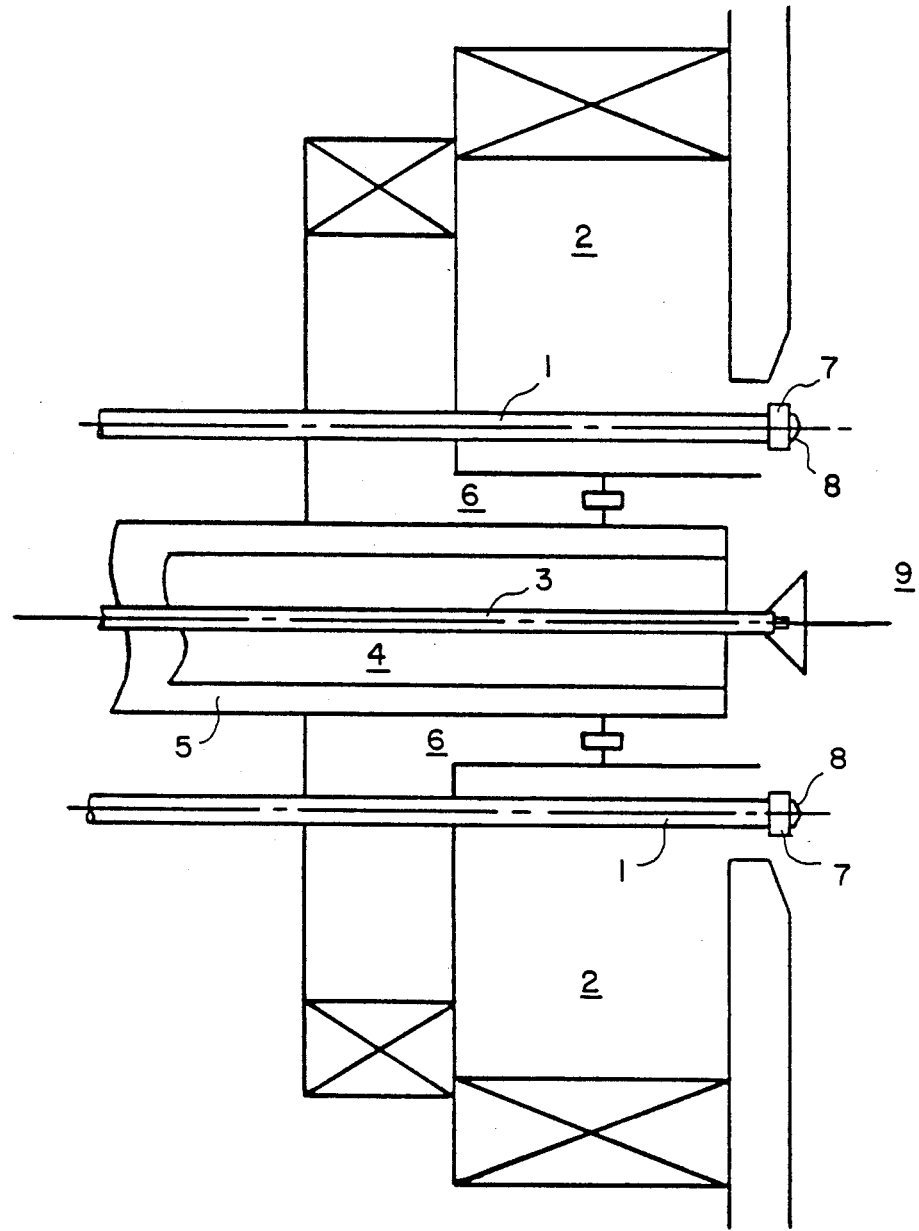
FIG. 1 is a schematic showing a prior art PG-DRB arrangement.
Figure 2:
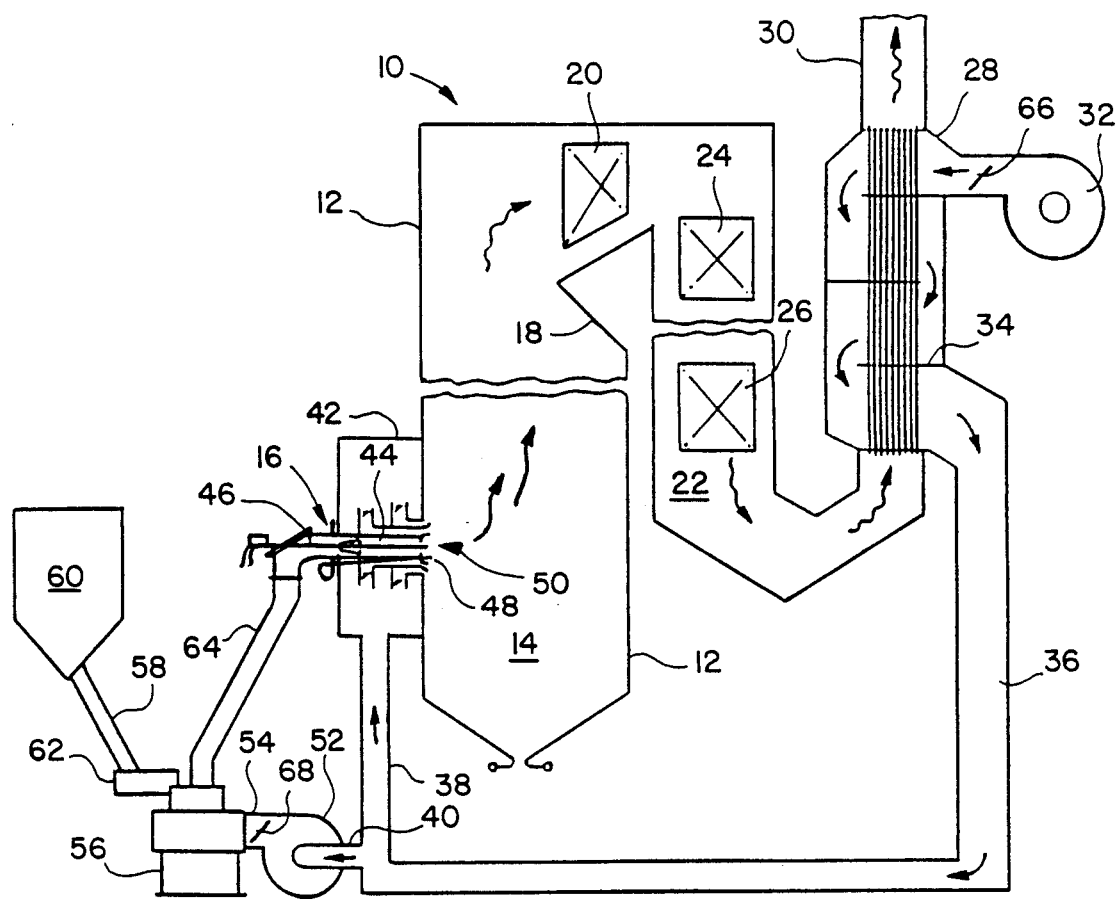
FIG. 2 is a schematic sectional elevation view of a vapor generator using fuel burning apparatus embodying the present invention.

Referring to the drawings generally, wherein like numerals designate the same element throughout the several drawings, and to FIG. 2 in particular, there is shown a vapor generator 10 including water cooled walls 12 which define a furnace chamber or combustion space 14 to which the fuel and air mixture is supplied by an improved burner 16. After combustion has been completed in the furnace chamber 14, the heated gases flow upwardly around the nose portion 18, over the tubular secondary superheater 20, and thence downwardly through the convection pass 22 containing the tubular primary superheater 24 and the economizer 26. The gases leaving the convection pass 22 flow though the tubes of an air heater 28 and are thereafter discharged through a stack 30. It will be understood that the heated gases passing over the superheaters 20 and 24 and the economizer 26 give up heat to the fluid flowing therethrough and that the gases passing through the air heater 28 give up additional heat to the combustion air flowing over the tubes. A forced draft fan 32 supplies combustion air to the vapor generator 10 and causes it to flow over the air heater tubes and around a plurality of baffles 34 and thence through a duct 36 for apportionment between branch ducts 38 and 40 respectively.

The air passing through duct 38 is delivered into a windbox 42 and represents, when firing coal, a major portion of the air necessary for combustion of the fuel being discharged from a tubular burner nozzle 44 associated with burner 16. The windbox air is proportioned between an inner annular passageway 90 and an outer annular passageway 94 for discharge through a burner port 50 and into the furnace 14. For oil firing, the burner 16 is provided with a retractable oil atomizer 46; similarly, for gas firing, the burner 16 is provided with a plurality of retractable and rotatable gas elements 48. When firing oil or gas, substantially all of the air necessary for combustion flows through the windbox 42; no substantial amount of air, other than nozzle sweep air, discussed infra, passes through the tubular burner nozzle 44. The particular details describing the oil atomizer 46 and the retractable and rotatable gas elements 48 will be presented infra.

The air passing through duct 40 is the remaining portion of air necessary for combustion and is delivered into a primary air fan 52 wherein it is further pressurized and thereafter conveyed through a duct 54 into an air-swept type pulverizer apparatus 56.

Pulverized fuel to be burned in the vapor generator 10 is delivered in raw form via pipe 58 from the raw pulverizer fuel storage bunker 60 to a feeder 62 in response to the load demand on the vapor generator 10 in a manner well known in the art. The pulverizer 56 grinds the raw fuel to the desired particle size. The pressurized air from primary air fan 52 sweeps through the pulverizer 56 carrying therewith the ground fuel particles fro flow through a pipe 64 and thence to the burner nozzle 44 for discharge through the port 50 into the furnace 14.

A damper 66 is associated with the forced draft fan 32 to regulate the total quantity of air being admitted to the vapor generating unit 10, in response to the load demand. A damper 68 is associated with the primary air fan 52 to regulate the quantity of air being introduced through the burner nozzle 44.

It will be appreciated that for the sake of clarity while the drawings depict one improved burner associated with one pulverizer wherein, in actual practice there may be more than one burner associated with a pulverizer, and there may be more than one pulverizer associated with the vapor generating unit.

DESCRIPTION OF THE PREFERRED EMBODIMENT

Figure 3:
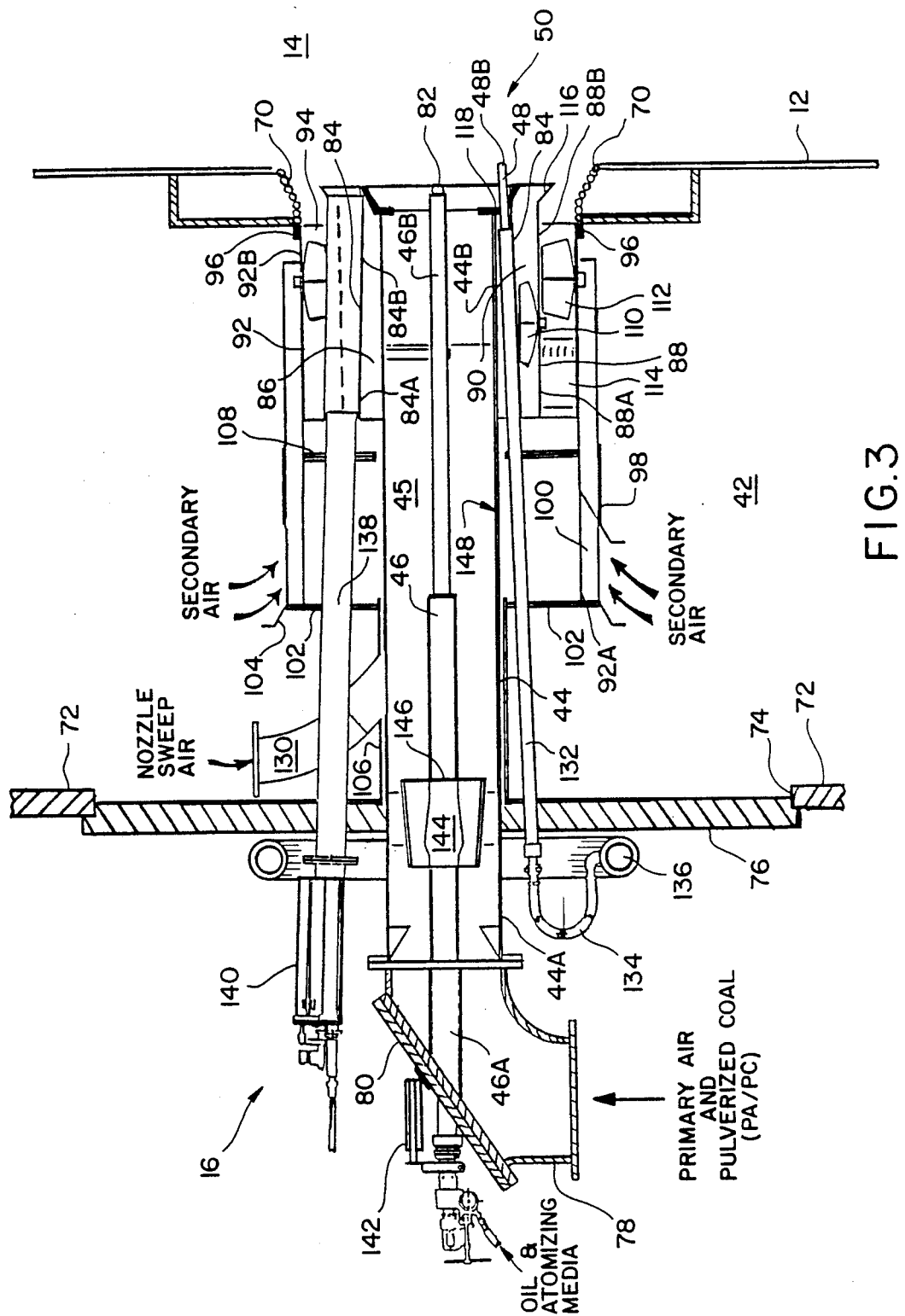
FIG. 3 is a sectional elevation view of the improved fuel burner of the present invention.
Figure 4:
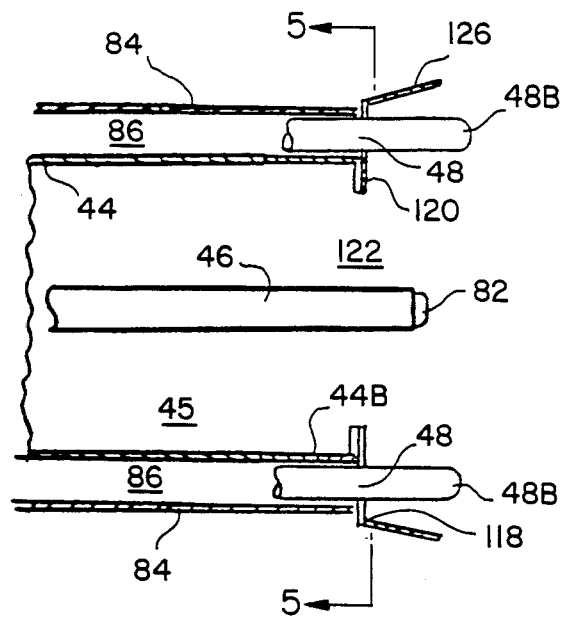
FIG. 4 is a close-up view of the right hand portion of FIG. 3.
Figure 5:
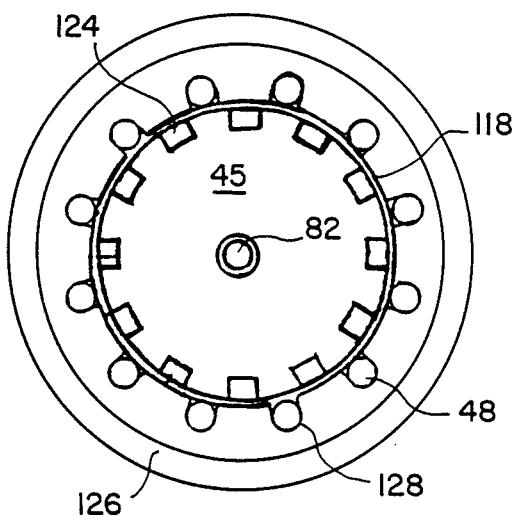
FIG. 5 is an end view of FIG. 4.

Referring now to FIGS. 3, 4 and 5, there is shown the improved fuel burner 16 arranged to fire through the burner port 50. The burner port 50 generally takes the shape of a frusto-conical throat which diverges towards the furnace side of the water cooled walls 12. In the burner port 50 the tubes 70 which comprise the water cooled walls 12, are bent out of the plane of the wall 12 to form the burner port 50. An outer burner wall 72 having an access opening 74 is spaced from the water cooled walls 12. The space between the outer burner wall 72 and the furnace walls 12 form the windbox 42.

The burner 16 includes the tubular burner nozzle 44 having an inlet end and an outlet end 44A and 44B respectively. The tubular burner nozzle 44 defines a central passageway 45 and extends through an access opening cover plate 76, across the windbox 42 to a point adjacent the burner port 50. The central passageway 45 defined by the tubular burner nozzle 44, conveys a mixture of primary air and pulverized coal particles PA/PC to the outlet end of the burner 16. An elbow member 78 is flow connected to the tubular burner nozzle inlet end 44A and at the other end to the pipe 64. Elbow member 78 includes a splash plate (end plate) 80 on its outside radius.

For oil firing, the burner 16 is provided with the retractable oil atomizer 46, having an inlet end 46A and an outlet end 46B, and which is centrally disposed and supported within the central passageway 45. The retractable oil atomizer 46 conveys a mixture of oil and atomizing media to an atomizer sprayer plate 82 located at the outlet end 46B of the atomizer 46. The atomizer spray plate 82 disperses the atomized oil at the outlet of the burner 16 in the vicinity of the burner port 50, and thence into the combustion chamber 14. The atomizing media, which can be air or steam, is needed to break the oil up into droplets which are small enough that they can be ignited, a function also performed by the design of the atomizer sprayer plate 82.

A gas zone sleeve 84 having an inlet end 84A and an outlet end 84B is concentrically arranged around the tubular burner nozzle 44 and partially defines an annular enclosure 86 therebetween. An inner zone sleeve 88 having an inlet end 88A and an oulet end 88B is concentrically arranged around the gas zone sleeve 84 and defines an inner annular passageway 90 therebetween. The inner annular passageway 90 conveys a first portion of secondary air needed for combustion to the outlet end of the burner 16. A burner barrel 92 having an inlet end 92A and an outlet end 92B is concentrically arranged around the inner zone sleeve 88 and defines an outer annular passageway 94 therebetween. The outer annular passageway 94 conveys a second portion of the secondary air needed for combustion to the outlet end of the burner 16. To accommodate differential expansion between the burner 16 and the furnace space or combustion chamber 14, a seal 96 is provided at the attachment of the burner barrel 92 to the tubes 70.

It will be understood that in the present discussion, the term "primary air" will refer to that portion of the combustion air which would accompany or transport the pulverized coal particles during coal firing. The term "secondary air" refers to that portion of the combustion air which is provided through the inner and outer annular passageways 90, 94 during firing of either coal, oil, or gas. This nomenclature is employed merely for convenience; it is well known to those skilled in the art that when firing oil or gas, substantially all of the air neccessary for combustion flows through the windbox 42. When oil or gas is fired, no substantial amount of air, other than nozzle sweep air which will be described below, passes through the tubular burner nozzle 44. Thus, in the present discussion there can be secondary air without any accompanying primary air.

A sliding air sleeve 98, is attached to the inlet end 92A of the burner barrel for varying the cross-sectional flow area of a bell-mouthed annular opening 100 in the burner barrel 92 to regulate the amount of secondary air supplied to the inner and outer annular passageways 90, 94. An annular burner barrel cover plate 102, having a lip 104, is attached to the inlet end 92A of the burner barrel and also to a tubular sleeve 106 which is attached to the access cover plate 76, The sliding air sleeve 98 can be positioned to achieve a desired cross-sectional air flow area of the bell-mouthed annular opening 100 by means of control rods (not shown) which would extend through the access opening cover plate 76, allowing adjustments while the vapor generator 10 is in operation. Such adjustments could be made either manually or by means of appropriately selected actuating devices. To facilitate appropriate selection of the position of the sliding air sleeve 98, a grid of pitot tubes 108 is located within the burner barrel 92 downstream of the bell-mouthed annular opening 100 and upstream of the inner and outer annular passageways 90, 94, for measuring the total secondary air admitted to the burner 16.

A plurality of inner vanes 110 are concentrically arranged around the tubular burner nozzle 44 in the inner annular passageway 90, and impart a swirling action to the first portion of secondary air passing through the inner annular passageway 90. Similarly, a plurality of outer vanes 112, 114 are concentrically arranged around the tubular burner nozzle 44 in the outer annular passageway 94 to impart a swirling action to the second portion of the secondary air passing through the outer annular passageway 94. Outer vane 114 may be fixed in place, if desired. Preferentially, the secondary air traveling through the outer annular passageway 94 is swirled by two stages of outer vanes 112, 114. Providing two stages of outer vanes 112, 114 improves the efficiency of swirl generation imparted to the secondary air passing through the outer annular passageway 94. If desired, adjustment of the position of the inner and outer vanes 110, 112 can be accomplished in the manner described in U.S. Pat. No. 4,380,202 to LaRue. An air separation vane 116, is connected to and extends outwardly from and circumferentially around the outlet end 88B of the inner zone sleeve 88. The air separation vane 116 influences the path of the first portion of secondary air as it exits from the burner 16, in the manner disclosed in U.S. Pat. No. 4,545,307 to Morita, et al.

To provide for gas firing capability, a plurality of retractable and rotatable gas elements 48 are concentrically arranged around the tubular burner nozzle 44 and extend through the annular enclosure 86. These gas elements 48 convey fuel gas to the outlet end of the burner 16, and have their outlet ends located in close proximity to the outlet end 44B of the tubular burner nozzle 44.

Referring also now to FIGS. 4 and 5, a flame stabilizing ring 118 is attached to the outlet end 44B of the tubular burner nozzle 44. Together, the tubular burner nozzle 44, the gas zone sleeve 84, and the flame stabilizing ring 118 define the annular enclosure 86 therebetween. The flame stabilizing ring 118 has a first portion 120 which circumferentially extends into the central passageway 45 of the tubular burner nozzle 44 end defines an opening 122 through which the mixture of primary air and pulverized coal particles would pass during coal firing. The first portion 120 can be a continuous surface or it can be provided with a plurality of serrations or teeth 124 as is disclosed in U.S. Pat. No. 4,545,307 to Morita, et al. Attached to the first portion 120 of the flame stabilizing ring 118 is a second, L-shaped portion 126 which extends circumferentially around and outwardly from the outlet end 44B of the tubular burner nozzle 44. A plurality of holes or openings 128, equal in number to the number of retractable and rotatable gas elements 48, are provided in the second, L-shaped portion 126. These openings 128 are adapted to closely receive therethrough each of the plurality of retractable gas elements 48. By providing this flame stabilizing ring 118 having the plurality of openings 48, the retractable and rotatable gas elements 48 are shielded from the secondary air which passes through the inner and outer annular passageways 90, 94, resulting in reduced $NO_x$ emissions when gas is fired in the burner 16. The reduced $NO_x$ reduction is caused by eddies produced by the flame stabilizing ring 118 which create a low oxygen/fuel rich flame. Particular sizing criteria of the overall dimensions of the flame stabilizing ring 118 would follow generally the criteria set forth in U.S. Pat. No. 4,545,307 to Morita, et al for what is described therein as the "bluff body".

When coal is fired in the improved burner 16, the retractable and rotatable gas elements 48, as well as the reatractable oil atomizer 46 are retracted to a position behind the flame stabilizing ring 118 to protect these components from overheating or fouling by deposits from the coal. For the case of gas or oil firing in the improved burner 16, the retractable oil atomizer 46 or the plurality of retractable and rotatable gas elements 48 are inserted into the burner port 50 so that they extend beyond the plane of the first portion 120 of the flame stabilizing ring 118. In the firing of oil or gas, a very small quantity of secondary air would be admitted to the tubular burner nozzle 44 through a nozzle air duct 130, which is shown in FIG. 3. This small quantity of secondary air or nozzle sweep air is admitted to the tubular burner nozzle 44 to prevent backflow of combustion byproducts into the tubular burner nozzle 44.

For the case of gas firing in the improved burner 16, additional elements are necessary to provide the fuel gas from a source (not shown) to the plurality of retractable and rotatable gas elements 48. A plurality of gas element support pipes 132 are sleeved around each of the plurality of gas elements 48. These gas element support pipes 132 position the gas elements 48 with respect to the flame stabilizing ring 118. Positioning of each of the gas elements 48 may involve moving the gas elements 48 towards or away from the furnace combustion chamber 14, rotation of the gas elements 48 about the longitudinal axis thereof, or any combination thereof. Attached to each of the plurality of gas elements 48 is a flexible gas hose 134 which allows for rotation, insertion and retraction of each of the gas elements 48. Finally, a gas manifold 136 provides a common source of fuel gas to which each of the plurality of gas hoses 134 is attached. Preferentially, the gas manifold 136 is located outside of the windbox 42 for ease of access and/or repair. This arrangement further facilitates servicing of the gas elements 48, since they can be removed from the burners 16 for inspection or cleaning by this arrangement while the vapor generator 10 is in service.

An ignitor assembly 138 of known construction would be provided to ignite the combustion mixture of fuel and air provided at the outlet of the burner 16. As shown in FIG. 3, the ignitor assembly 138 would extend through the access opening cover plate 76 through the windbox 42 and terminate in the vicinity of the burner port 15. An actuator 140 can be applied to the ignitor 138 for automatic positioning thereof. Similarly, an actuator 142, attached to the inlet end of the oil atomizer 46A and to the splash plate 80, can be used to position the oil atomizer 46. In the same manner, atutomatic actuator means (not shown) can be used to position the plurality of gas elements 48 with respect to the flame stabilizing ring 118. Whether the positioning of the gas elements 48 is by manual or automatic means however, the critical feature to be observed is that the outlet ends 48B of each of the gas elements 48 should be placed during gas firing such that they receive the full benefit of the shielding effect from the secondary air that is provided by the flame stabilizing ring 118. Finally, the improved burner 16 can employ a frusto-conical difusser 144 disposed within the inlet end 44A of the tubular burner nozzle 44 and which has an opening 146 through which the retractable oil atomizer 46 can pass. The frusto-conical diffuser 144 would disperse the majority of the pulverized coal particles entrained in the primary air to a location near the inside surface 148 of the tubular burner nozzle 44, leaving the central portion of the central passageway 45 relatively free of pulverized coal particles. Particular design features of the frusto-conical diffuser would be applied as disclosed in U.S. Pat. No. 4,380,202 to LaRue.

The flame stabilizing ring 118 has a significant effect on the mixture of primary air and pulverized coal particles during coal firing. The flame stabilizing ring 118 causes recirculation of this stream therewithin in a manner which promotes ignition of the coal particles and improved flame stability. The arrangement of the gas zone sleeve 84 with its junction at the flame stabilizing ring 118 in combination with the tubular burner nozzle 44 prevents the flow of any secondary air through the annular enclosure 86. As a consequence, the flame formed by the ignited pulverized coal fuel jet in the flame stabilizing ring 118 together with the regulated introduction of secondary air through the inner and outer annular passageways 90, 94 produces very low $NO_x$ emissions when firing coal, as disclosed in U.S. Pat. No. 4,545,307 to Morita, et al.

For the case of oil firing, the ignited fine mist of fuel oil droplets produced by the atomizer spray plate 82 located in the center of the flame stabilizing ring 118 also achieves reduced $NO_x$ formation levels. Flow profiles produced by the secondary air traveling through the inner and outer annular passageways 90, 94 are affected by the flame stabilizing ring 118 and air separation vane 116 to reduce oxygen availability to the oil flame in a zone immediately downstream of the burner port 50, which acts to inhibit formation of NO and $NO_2$. Complete mixing of the secondary air with the partially burned oil fuel occurs further downstream in a series of reactions at lower temperatures and lower oxygen partial pressures such that $NO_x$ formation is avoided as the char reactions are completed. Combustion tests indicate an ability to reduce $NO_x$ at typical excess air levels from uncontrolled levels of 200 ppm to levels in the range of 120 ppm, without two stage combustion or gas recirculation when firing oil. By uncontrolled, the burner 16 was operated without the flame stabilizing ring 118 or the air separation vane 116.

For the case of gas firing, the arrangement of retractable and rotatable gas elements 48 positioned to be shielded by the flame stabilizing ring 118 results in an extremely stable flame. Combustion tests have demonstrated stable combustion from levels of 100% burner input to levels less than 10% maximum input without excessive flame induced vibration or rumble. With respect to $NO_x$ emissions when firing gas, no uncontrolled tests of the burner 16 without the flame stabilizing 118 or the air separation vane 116 were performed. Combustion tests were performed with the elements, however, and $NO_x$ levels were see in the range of 130–150 ppm. Based upon experience with previous design burners, and upon a scaling factor to compare the uncontrolled oil firing performance to a hypothetical uncontrolled gas firing performance, it is estimated that the burner 16 would produce $NO_x$ levels of approximately 190 ppm in an uncontrolled (no flame stabilizing ring 118 or air separation vane 116) setting under similar conditions, showing the burner 16 $NO_x$ reduction capability when firing gas.

While in accordance with provisions of the statutes there is illustrated and described herein a specific embodiment of the invention, those skilled in the art will understand that changes may be made in the form of the invention covered by the following claims, and that certain features of the invention may sometimes be used to advantage without a corresponding use of the other features. For example, the improved burner can be arranged to fire only one, or two, of the fuels by deleting the unnecessary elements. In all cases the burner nozzle is retained fully or in part, but would not be used to transport fuel of coal is not fired.

I claim:

1. A burner for the combustion if coal, oil or gas, comprising:
   a tubular burner nozzle having an inlet end and an outlet end and which defines a central passageway for conveying primary air containing pulverized coal particles therethrough to an outlet end of the burner;
   a gas zone sleeve having an inlet end and an outlet end, concentrically arranged around the tubular burner nozzle and partially defining an annular enclosure therebetween;
   an inner zone sleeve having an inlet end and an outlet end, concentrically arranged around the gas zone sleeve and defining an inner annular passageway therebetween, for conveying a first portion of secondary air needed for combustion to the outlet end of the burner;
   a burner barrel having an inlet end and an outlet end, concentrically arranged around the inner zone sleeve and defining an outer annular passageway therebetween, for conveying a second portion of secondary air needed for combustion to the outlet end of the burner;
   an air separation vane, connected to an extending outwardly and circumferentially around the outlet end of the inner zone sleeve, for influencing the path of the first portion of secondary air as it exits from the burner;
   a retractable oil atomizer having an inlet end and an outlet end, centrally disposed and supported within the central passageway, for conveying a mixture of oil and atomizing media to an atomizer sprayer plate located at the outlet end of the atomizer at the outlet end of the burner;
   a plurality of retractable and rotatable gas elements, concentrically arranged around the tubular burner nozzle and extending through the annular enclosure, for conveying gas to the outlet end of the burner, having outlet ends located in close proximity to the outlet end of the tubular burner nozzle, and being shielded from the secondary air when fully inserted into the burner by;
   a flame stabilizing ring, attached to the outlet end of the tubular burner nozzle and which together with the tubular burner nozzle and the gas zone sleeve defines the annular enclosure therebetween, having a first portion circumferentially extending into the central passageway to define an opening therein, a second L-shaped portion attached to the first portion of the flame stabilizing ring extending circumferentially around and outwardly from the outlet end of the tubular burner nozzle, and having a plurality of openings adapted to closely receive therethrough each of the plurality of retractable gas elements.

2. An apparatus according to claim 1, further including:
   first and second means for retracting, respectively, the oil atomizer and its attached sprayer plate, and the plurality of gas elements, to a position behind the flame stabilizing ring when coal is fired to protect the oil atomizer, the sprayer plate and the gas elements from overheating or fouling.

3. An apparatus according to claim 2, further including:
   a sliding air sleeve attached to the inlet end of the burner barrel, for varying the cross-sectional air flow area of a bell-mouthed annular opening in the burner barrel to regulate the amount of secondary air supplied to the inner and outer annular passageways.

4. An apparatus according to claim 3, further including:
   a nozzle air duct, attached to the tubular burner nozzle, for supplying a quantity of secondary air to the tubular burner nozzle sufficient to prevent backflow of combustion byproducts thereinto when the burner is firing oil or gas.

5. An apparatus according to claim 4, further including:
   a frustoconical diffuser, disposed within the inlet end of the tubular burner nozzle and having an opening through which the retractable oil atomizer passes, to disperse the majority of the pulverized coal particles in the primary air near an inside surface of the tubular burner nozzle, leaving the central portion of the central passageway relatively free of pulverized coal particles.

6. Apparatus according to claim 1, further including:
   a plurality of gas element support pipes, sleeved around each of the plurality of gas elements, for positioning the gas elements with respect to the flame stabilizing ring;
   a plurality of flexible gas hoses, attached to each of the plurality of gas element support pipes, for conveying fuel gas to, and allowing rotation, insertion and restriction of, each gas element support pipe; and
   a gas manifold, to which each of the plurality of gas hoses is attached, for supplying fuel gas to each of the gas hoses.

7. Apparatus according to claim 6, further including:
   a retractable lighter, arranged for insertion into the inner annular passageway to a point at the outlet end of the burner so as to ignite a fuel and air mixture.

8. Apparatus according to claim 1, further including:
   a plurality of inner vanes, concentrically arranged around the tubular burner nozzle in the inner annular passageway, to impart a swirling acion to the first portion of secondary air as it leaves the inner annular passageway;
   a plurality of outer vanes, concentrically arranged around the tubular burner nozzle in the outer annular passageway, to impart a swirling action to the second portion of the secondary air as it leaves the outer annular passageway; and
   a grid of pitot tubes, located within the burner barrel downstream of the bell-mouthed annular opening thereinto and upstream of the inner and outer annular passageways, for measuring the total secondary air admitted to the burner.

9. A flame stabilizing ring for a burner having a plurality of gas elements concentrically arranged around and in close proximity to a tubular burner nozzle having a central passageway and outlet end, and at least one annular passageway concentrically arranged around the plurality of gas elements for transporting a quantity of air to an outlet end of the burner for combustion, comprising:
 a first portion, attached to the outlet end of the tubular burner nozzle and circumferentially extending into the central passageway to define an opening therein; and
 a second, L-shaped portion attached to the first portion of the flame stabilizing ring extending circumferentially around and outwardly from the outlet end of the tubular burner nozzle, having a plurality of openings adapted to closely receive therethrough each of the plurality of gas elements, such that outlet ends of each of the plurality of gas elements is shielded from the quantity of air for combustion transported by the at least one annular passageway.

10. A burner for combustion of oil or gas, comprising:
 a tubular burner nozzle having an inlet end and an outlet end, an outlet being located at the outlet end of the burner;
 a gas zone sleeve having an inlet end and an outlet end, concentrically arranged around the tubular burner nozzle and partially defining an annular enclosure therebetween;
 an inner zone sleeve having an inlet end and an outlet end concentrically arranged around the gas zone sleeve and defining an inner annular passageway therebetween, for conveying a first portion of secondary air needed for combustion to the outlet end of the burner;
 a burner barrel having an inlet end and an outlet end, concentrically arranged around the inner zone sleeve and defining an outer annular passageway therebetween, for conveying a second portion of secondary air needed for combustion to the outlet end of the burner;
 an air separation vane, connected to and extending outwardly and circumferentially around the outlet end of the inner zone sleeve, for influencing the path of the first portion of secondary air as it exits from the burner;
 a retractable oil atomizer having an inlet end and an outlet end, centrally disposed and supported within the central passageway, for conveying a mixture of oil and atomizing media to an atomizer sprayer plate located at the outlet end of the atomizer at the outlet end of the burner;
 a plurality of retractable and rotatable gas elements, concentrically arranged around the tubular burner nozzle and extending through the annular enclosure, for conveying gas to the outlet end of the burner, having outlet ends located in close proximity to the outlet end of the tubular burner nozzle, and being shielded from the secondary air when fully inserted into the burner by:
 a flame stabilizing ring, attached to the outlet end of the tubular burner nozzle and which together with the tubular burner nozzle and the gas zone sleeve defines the annular enclosure therebetween, having a first portion circumferentially extending into the central passageway to define an opening therein, a second L-shaped portion attached to the first portion of the flame stabilizing ring extending circumferentially around and outwardly from the outlet end of the tubular burner nozzle, and having a plurality of openings adapted to closely receive therethrough each of the plurality of retractable gas elements.

11. A burner for combustion of coal or gas, comprising:
 a tubular burner nozzle having an inlet end and an outlet end and which defines a central passageway for conveying primary air containing pulverized coal particles therethrough to an outlet end of the burner;
 a gas zone sleeve having an inlet end and an outlet end, concentrically arranged around the tubular burner nozzle and partially defining an annular enclosure therebetween;
 an inner zone sleeve having an inlet end and an outlet end concentrically arranged around the gas zone sleeve and defining an inner annular passageway therebetween, for conveying a first portion of secondary air needed for combustion to the outlet end of the burner;
 a burner barrel having an inlet end and an outlet end, concentrically arranged around the inner zone sleeve and defining an outer annular passageway therebetween, for conveying a second portion of secondary air needed for combustion to the outlet end of the burner;
 an air separation vane, connected to and extending outwardly and circumferentially around the outlet end of the inner zone sleeve, for influencing the path of the first portion of secondary air as it exits from the burner;
 a plurality of retractable and rotatable gas elements, concentrically arranged around the tubular burner nozzle and extending through the annular enclosure, for conveying gas to the outlet end of the burner, having outlet ends located in close proximity to the outlet end of the tubular burner nozzle, and being shielded from the secondary air when fully inserted into the burner by:
 a flame stabilizing ring, attached to the outlet end of the tubular burner nozzle and which together with the tubular burner nozzle and the gas zone sleeve defines the annular enclosure therebetween, having a first portion circumferentially extending into the central passageway to define an opening therein, a second L-shaped portion attached to the first portion of the flame stabilizing ring extending circumferentially around and outwardly from the outlet end of the tubular burner nozzle, and having a plurality of openings adapted to closely receive therethrough each of the plurality of retractable gas elements.

12. A burner for combustion of gas, comprising:
 a tubular burner nozzle having an inlet end and an outlet end, the outlet end being located at an outlet end of the burner;
 a gas zone sleeve having an inlet end and an outlet end, concentrically arranged around the tubular burner nozzle and partially defining an annular enclosure therebetween;
 an inner zone sleeve having an inlet end and an outlet end concentrically arranged around the gas zone sleeve and defining an inner annular passageway therebetween, for conveying a first portion of secondary air needed for combustion to the outlet end of the burner;
 a burner barrel having an inlet end and an outlet end, concentrically arranged around the inner zone sleeve and defining an outer annular passageway therebetween, for conveying a second portion of secondary air needed for combustion to the outlet end of the burner;

an air separation vane, connected to and extending outwardly and circumferentially around the outlet end of the inner zone sleeve, for influencing the path of the first portion of secondary air as it exits from the burner;

a plurality of retractable and rotatable gas elements, concentrically arranged around the tubular burner nozzle and extending through the annular enclosure, for conveying gas to the outlet end of the burner, having outlet ends located in close proximity to the outlet end of the tubular burner nozzle, and being shielded from the secondary air when fully inserted into the burner by:

a flame stabilizing ring, attached to the outlet end of the tubular burner nozzle and which together with the tubular burner nozzle and the gas zone sleeve defines the annular enclosure therebetween, having a first portion circumferentially extending into the central passageway to define an opening therein, a second L-shaped portion attached to the first portion of the flame stabilizing ring extending circumferentially around and outwardly from the outlet end of the tubular burner nozzle, and having a plurality of openings adapted to closely receive therethrough each of the plurality of retractable gas elements.

* * * * *